(12) United States Patent
Vitanov et al.

(10) Patent No.: US 7,877,725 B2
(45) Date of Patent: Jan. 25, 2011

(54) SYSTEM AND METHOD FOR DYNAMIC GENERATION AND CUSTOMIZATION OF WEB SERVICE CLIENT APPLICATIONS FOR TERMINALS

(75) Inventors: Kamen Vitanov, Toronto (CA); Michael Shenfield, Richmond Hill (CA); David P. Yach, Waterloo (CA)

(73) Assignee: Research In Motion Limited, Waterloo (CA)

( * ) Notice: Subject to any disclaimer, the term of this patent is extended or adjusted under 35 U.S.C. 154(b) by 931 days.

(21) Appl. No.: 10/787,932

(22) Filed: Feb. 27, 2004

(65) Prior Publication Data

US 2005/0125771 A1 Jun. 9, 2005

Related U.S. Application Data

(60) Provisional application No. 60/503,978, filed on Sep. 17, 2003.

(51) Int. Cl.
*G06F 9/44* (2006.01)
*G06F 15/16* (2006.01)
(52) U.S. Cl. .................................... 717/106; 709/201
(58) Field of Classification Search ................ 717/100, 717/104–109; 709/201–203
See application file for complete search history.

(56) References Cited

U.S. PATENT DOCUMENTS

| 7,284,039 | B2* | 10/2007 | Berkland et al. | 709/219 |
|---|---|---|---|---|
| 7,322,031 | B2* | 1/2008 | Davis et al. | 717/177 |
| 7,340,714 | B2* | 3/2008 | Upton | 717/102 |
| 7,587,447 | B2* | 9/2009 | Ryman | 709/203 |
| 7,610,575 | B2* | 10/2009 | Sproule | 717/103 |
| 2002/0080200 | A1* | 6/2002 | Wong et al. | 345/969 |
| 2003/0093468 | A1* | 5/2003 | Gordon et al. | 709/203 |
| 2003/0120659 | A1* | 6/2003 | Sridhar | 707/100 |
| 2003/0191769 | A1* | 10/2003 | Crisan et al. | 707/100 |
| 2004/0003033 | A1* | 1/2004 | Kamen et al. | 709/203 |
| 2004/0024841 | A1* | 2/2004 | Becker et al. | 709/219 |
| 2004/0044656 | A1* | 3/2004 | Cheenath | 707/3 |

(Continued)

FOREIGN PATENT DOCUMENTS

WO    WO 2004/003787 A    1/2004

OTHER PUBLICATIONS

TDB-ACC-No. NNRD455132, "Method of Enabling Automated Invocation of Web Services", IBM technical Disclosure Bulletin, Mar. 2002.*

(Continued)

*Primary Examiner*—Wei Y Zhen
*Assistant Examiner*—Qing Chen
(74) *Attorney, Agent, or Firm*—Gowling Lafleur Henderson LLP

(57) ABSTRACT

Many web services require different application programs to access their data. Further, as new web services are developed, they may not be compatible with current application programs. Methods and servers are presented for dynamically generating an application program for interaction with a service, the service interacting with a terminal via a network. One exemplary method comprises obtaining schema definitions of the service, the service interacts with the application executed on a terminal via a network and parsing the schema definition. A plurality of interface element definitions from the parsed schema definition is generated. An application template using the plurality of interface element definitions is assembled and customized. The application is generated using the application template.

29 Claims, 6 Drawing Sheets

U.S. PATENT DOCUMENTS

| | | | |
|---|---|---|---|
| 2004/0083479 A1* | 4/2004 | Bondarenko et al. | 719/310 |
| 2004/0111525 A1* | 6/2004 | Berkland et al. | 709/231 |
| 2004/0177335 A1* | 9/2004 | Beisiegel et al. | 717/102 |
| 2004/0215700 A1* | 10/2004 | Shenfield et al. | 709/201 |

OTHER PUBLICATIONS

Naresh Apte and Toral Mehta, "UDDI: Building Registry-Based Web Services Solutions", Prentice Hall, Dec. 2002.*

Curbera et al., "Business Process Execution Language for Web Services, Version 1.0," Jul. 2002, IBM Corp.*

Capeclear: "CapeStudio 3 Technical Overview" 'Online! Mar. 2002.

Harrison W Ed—Institute of Electrical and Electronics Engineers: "Using service specific proxies to migrate web services to the Wireless web: an illustrative case study of adaptive maintenance", Proceedings IEEE International Conference on Software Maintenance. ICSM-2002. Montreal, Quebec, Canada, Oct. 3-6, 2002, IEEE International Conference on Software Maintenance, Los Alamitos, CA: IEEE Comp. SOC, US, Oct. 3, 2002.

Zenc L et al: "Flexible Composition of Enterprise Web Services" International Journal of Electronic Commerce and Business Media, 'Online! vol. 13, No. 2, Jun. 2003.

"PCT Notification of Transmittal of the International Search Report and the Written Opinion of the International Searching Authority, or the Declaration" for International Patent Application No. PCT/CA2004/000195, Sep. 14, 2004, 14 pages, International Searching Authority.

"Method of Enabling Automated Invocation of Web Services" WS Invocation Automation.

Graham Glass "The Web Services (R)evolution, Part 4 Web Services Description Language (WSDL)" Feb. 2001 http://www-106.lbm.com/developerworks/library/ws-peer4/.

* cited by examiner

SYSTEM AND METHOD FOR DYNAMIC GENERATION AND CUSTOMIZATION OF WEB SERVICE CLIENT APPLICATIONS FOR TERMINALS

This application claims the benefits of earlier filed provisional application No. 60/503,978, filed Sep. 17, 2003, which is herein incorporated by reference.

BACKGROUND

The present application relates to generation of applications for interaction of terminals with schema defined services.

Current access to backend services is through a web service that formats the data obtained from the back end services in the form of HTML pages for communication through a web server to a networked client device. Disadvantages of this architecture include static access of the back end data by the client device through non-editable HTML pages, which can consume device resources.

Preferably, the client device would like to intelligently access the data provided by the back end services. However, current client devices do not have the tools necessary for this type of interaction. Further, the current web services do not have the capability of direct interaction with the client devices based on the initial queries submitted by the client device.

Many different web services require different application programs to access their data, and it is not practical for a wireless device to contain a sufficient number of application programs such that the device would be able to access all the available web services. Further, as new web services are developed, they may not be compatible with current application programs.

Systems and methods are disclosed herein that provide a dynamic generation system and method of schema-defined service applications to obviate or mitigate some of the above presented disadvantages.

SUMMARY

Many different web services require different application programs to access their data, and it is not practical for a wireless device to contain a sufficient number of application programs such that the device would be able to access all the available web services. Further, as new web services are developed, they may not be compatible with current application programs. Contrary to current generation methods for application programs there is provided a system and method for dynamically generating components of an application program for interaction with a selected schema defined service, the application for execution on a terminal coupled to the service via a network. The method comprises obtaining schema definitions of the service from a source and parsing the schema definitions for identifying an interface element. The interface element can include a plurality of element definitions. The method also builds a model of a service interface for representing the service, the service interface including the identified interface element. The method also generates an application template according to the model, the template including at least one of the element definitions comprising the interface element, wherein the template is configured for customization for assembling the application for execution by the terminal.

A method for dynamically generating components of an application program for interaction with a selected schema defined service, the application for execution on a terminal coupled to the service via a network is disclosed, the method comprising the steps of: obtaining schema definitions of the service from a source; parsing the schema definitions for identifying an interface element, the interface element including a plurality of element definitions; building a model of a service interface for representing the service, the service interface including the identified interface element; generating an application template according to the model, the template including at least one of the element definitions comprising the interface element; wherein the template is configured for customization for assembling the application for execution by the terminal.

There is further provided a server for dynamically generating components of an application program for interaction with a selected schema defined service, the application for execution on a terminal coupled to the service via a network, the server comprising: a network interface for obtaining schema definitions of the service from a source; a parser module for parsing the schema definitions to identify an interface element, the interface element including a plurality of element definitions; a model module configured for representing a model of a service interface for representing the service, the service interface including the identified interface element; a builder module for generating an application template according to the model, the template including at least one of the element definitions comprising the interface element; wherein the template is configured for customization for assembling the application for execution by the terminal.

Also disclosed is a computer program product for dynamically generating components of an application program for interaction with a selected schema defined service, the application for execution on a terminal coupled to the service via a network, the computer program product comprising: a computer readable medium; a network interface module stored on the computer readable medium for obtaining schema definitions of the service from a source; a parser module stored on the computer readable medium for parsing the schema definitions to identify an interface element, the interface element including a plurality of element definitions; a model module coupled to the parser module configured for representing a model of a service interface for representing the service, the service interface including the identified interface element; a builder module coupled to the model module for generating an application template according to the model, the template including at least one of the element definitions comprising the interface element; wherein the template is configured for customization for assembling the application for execution by the terminal.

BRIEF DESCRIPTION OF THE DRAWINGS

These and other features will become more apparent in the following detailed description in which reference is made to the appended drawings by way of example only, wherein.

DESCRIPTION

Network System

Figure 1:
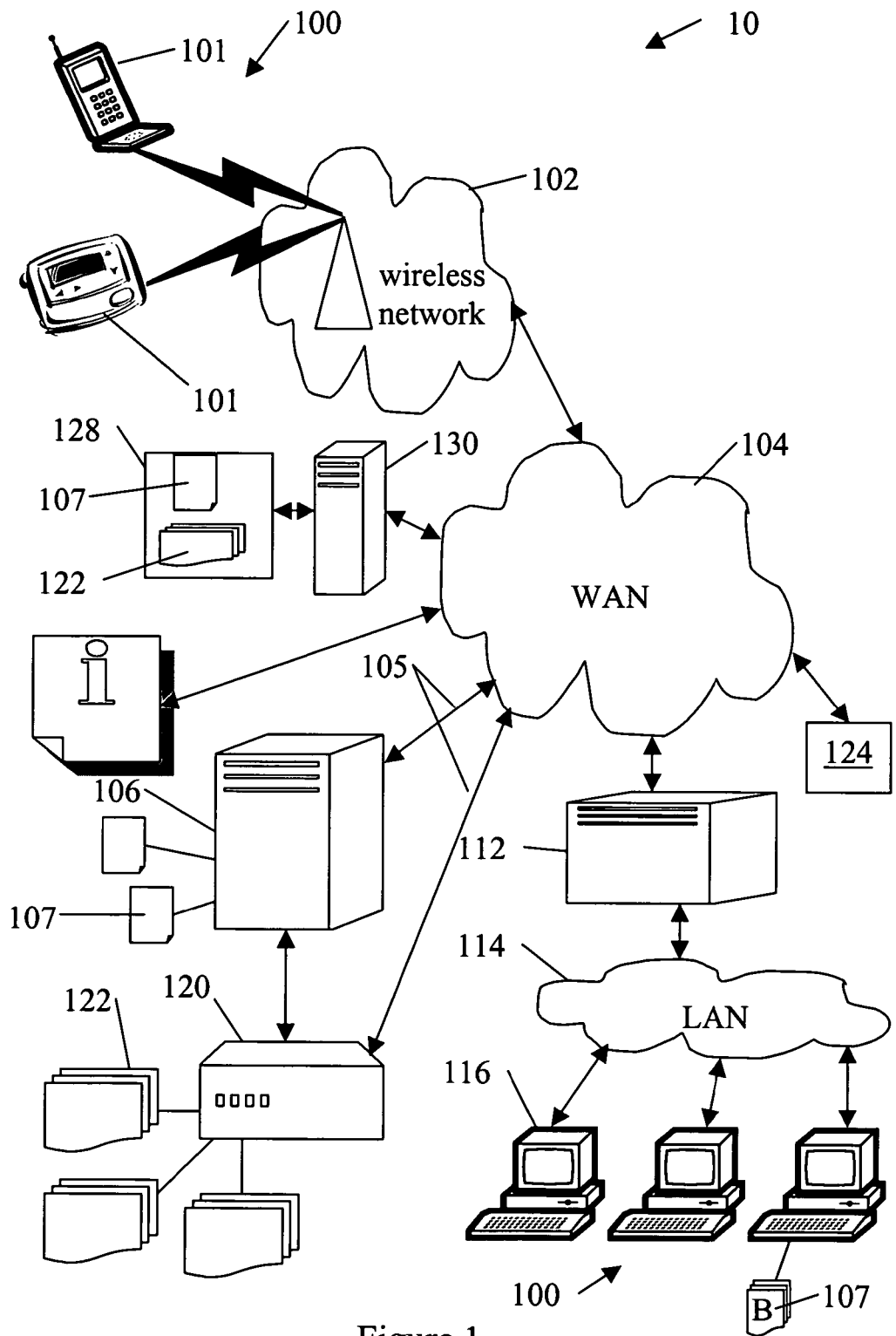
FIG. 1 is a block diagram of a network system.

Referring to FIG. 1, a network system 10 comprises a plurality of terminals 100 for interacting with one or more template generation servers 106, via a coupled Wide Area Network (WAN) 104 such as but not limited to the Internet. These generic terminals 100 can be any suitable terminal such as but not limited to wired devices such as personal computers 116, wireless devices 101, PDAs, self-service kiosks and the like. The generation server 106 provides application templates 107 through messages 105 to the terminal 100. The application templates 107 are sent from the server 106 to the terminal 100 when requested, for customization. It is recognized that the application templates 107 could also be sent by the generation server 106 to an independent customization provider 120, which can be a development environment for customizing the application User Interface (UI), communication with the web service 110 and the applications 122 process workflow. In this case, the provider 120 would send completed applications 122 to the terminal 100. The terminal 100 uses the applications 122 to access or otherwise communicate with a web service 110, or other schema-defined services such as but not limited to SQL databases. It is recognised that the server 106 could be an independent server or provided by the web service 110.

Figure 5:
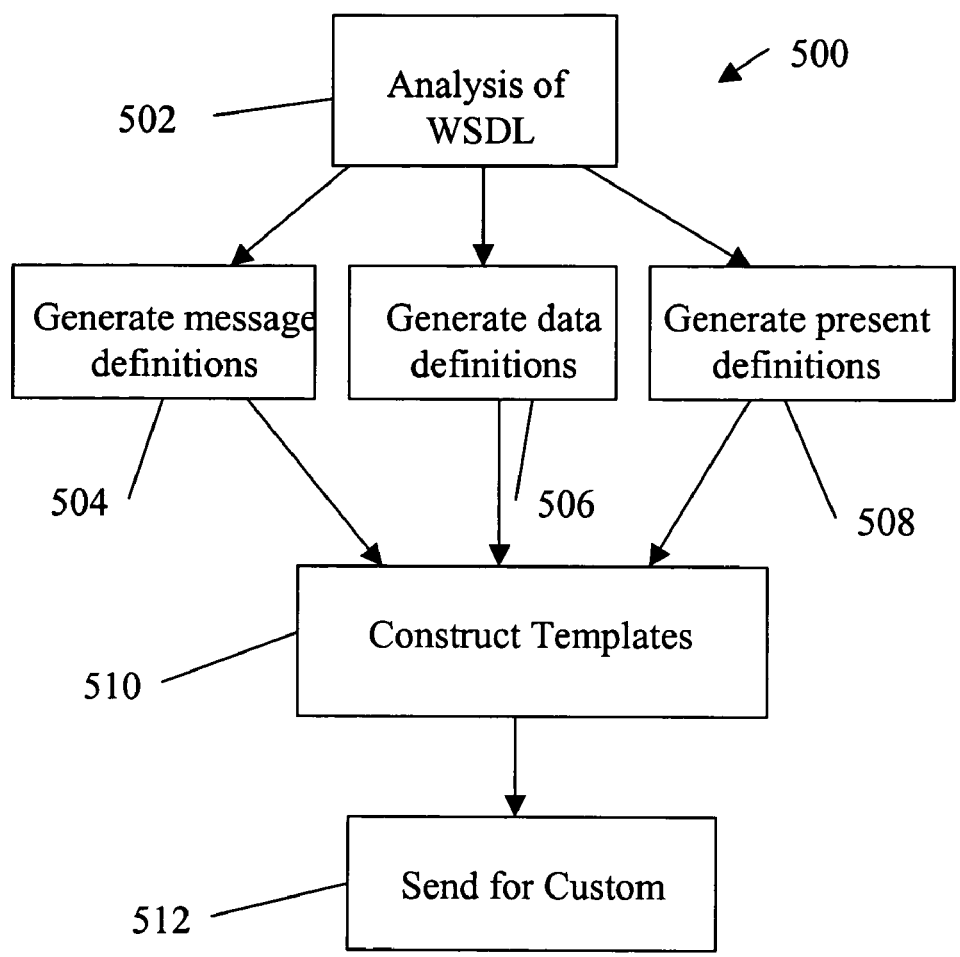
FIG. 5 is a flowchart illustrating a method of building the application templates of FIG. 2.

The terminal 100 contacts the generation server 106 to ultimately obtain the applications 122. The terminal can first become aware of the web service 110 through a Universal Description, Discovery, and Integration (UDDI) service registry 124, which contains reference to the web service 110. The server 106 can use the registry 124 and/or the web service 110 to generate the model templates 107 based on the definition of the service 110. The service can be defined according to a structured definition language, such as but not limited to WSDL. It is recognized that repositories or databases 128, accessed by a repository server 130, can be used to store completed templates 107 and/or applications 122 if desired. Further, the system 10 can also have a gateway server 112 for connecting the desktop terminals 116 via a Local Area Network (LAN) 114 to the server 106. Further, the system 10 can have a wireless network 102 for connecting the wireless devices 101 to the WAN 104. It is recognized that other terminals and computers (not shown) could be connected to the server 106 via the WAN 104 and associated networks other than as shown in FIG. 5. The generic terminals 100, wireless devices 101 and personal computers 116 are hereafter referred to as the terminal for the sake of simplicity. Further, the networks 102, 104, 112 of the system 10 will hereafter be referred to as the network 104, for the sake of simplicity. It is recognized that there could be multiple servers 106, 112, 130 if desired.

Customization Environment

Figure 2:
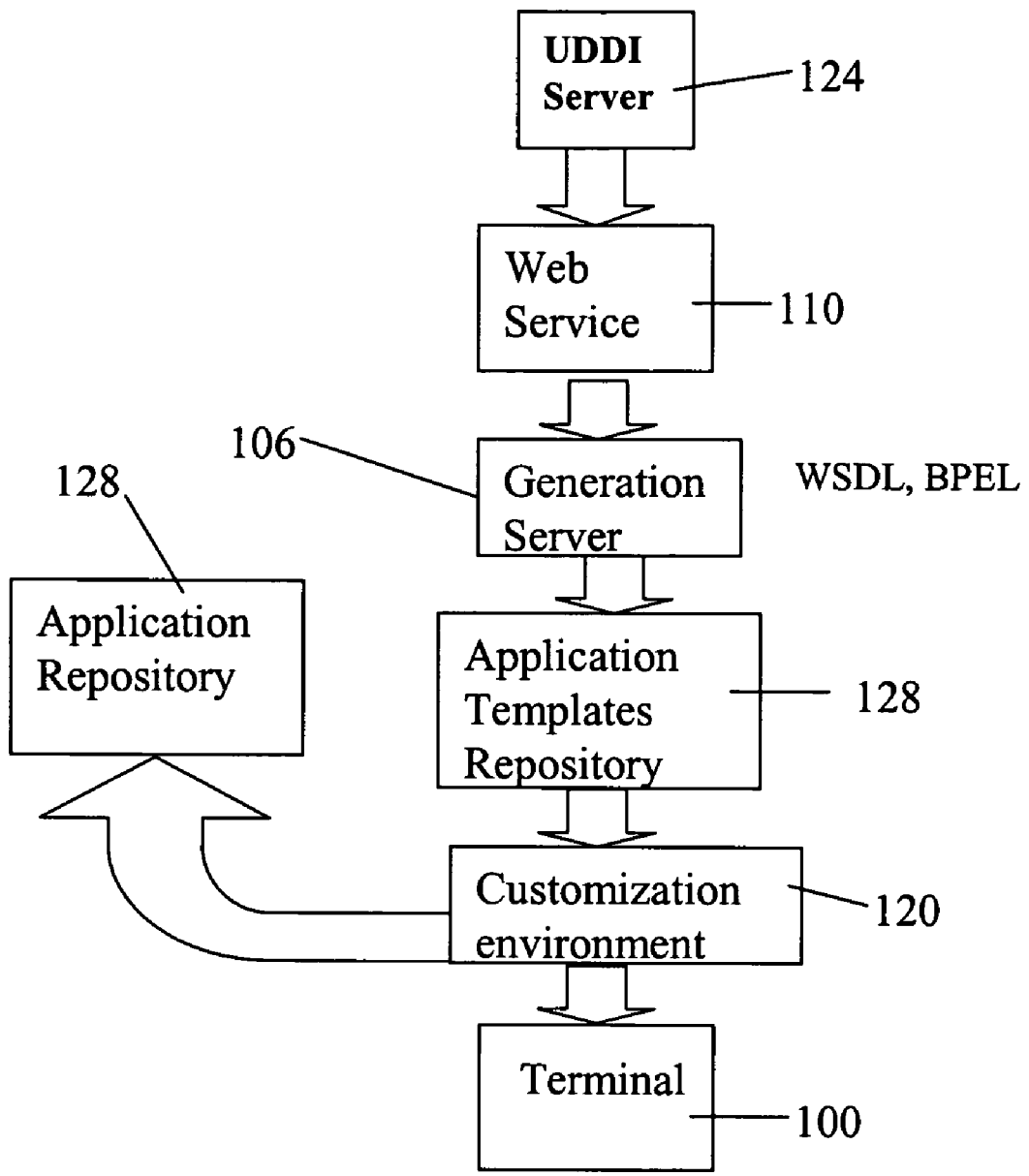
FIG. 2 is a block diagram of a dynamic generation and customization configuration of the system of FIG. 1.

Referring to FIGS. 1 and 2, the terminal 100 first becomes aware of or otherwise discovers a particular user selected web service 110 through, for example, a registry service such as the UDDI 124. The UDDI 124 can contain a reference or link to the generation server 106, whereby the terminal 100 can obtain the appropriate application 122 for interaction with the web service 110, such as by request/response messages 105 using an appropriate communication protocol such as, but not limited to, Simple Object Access Protocol (SOAP). It is also recognized that the terminal 100 could get knowledge of existing generation servers 106 and/or services 110 available over the Internet (WAN 104) by third parties (not shown), or that the terminal 100 could hold the address of the generation server 106 in the terminal 100 memory.

The terminal 100 then contacts the appropriate generation server 106 with the request 105 for the Application Program 122 to be able to interact with the selected web service 110. The generation server 106 then obtains a definition 300, 302, 304 (see FIG. 3) of the services offered by the web service 110, such as but not limited to services expressed in a structured definitional language (e.g., Web Services Description Language (WSDL)). It is recognized that the generation server 106 can obtain the web service 110 definition from registry 124, or directly through contact with the web service 110, or through a service provider of the web service 110 (not shown). It is further recognized that the general schema defined service (e.g. WSDL) of the web service 110 can also contain additional web service metadata definitions, such as but not limited to metadata definitions in Business Process Execution Language (BPEL). One example of an additional definition is information on linking between messages 105.

Using the web service definitions 300, 302, 304 (see FIG. 3), the generation server 106 then generates the appropriate Application Templates 107, containing message 300, data 302 and/or presentation definitions 304. The generation server 106 then submits the Application Templates 107 directly to the terminal 100 for subsequent customization to produce the desired Application 122 for interaction with the selected web service 110. It is also recognized that the Application Template 107 could be customized by the customization provider 120 before being submitted to the terminal 100. For example, the terminal 100 making the request 105 for application 122 generation may be allowed to customize new or existing applications 122 and/or templates 107, if the user is authorized to customise.

It is recognised that the repository 128 can be split as two dedicated repositories, one for applications 122 and one for templates 107. The Application Template Repository 128 can represent a centralized location for storing application templates 107. The application templates 107 can be stored and provided to other users requesting customizations of the same web service 110. The Application Repository 128 can represent a centralized location for storing completed applications 122 and making them available to other users.

Application Templates 107

Figure 3:
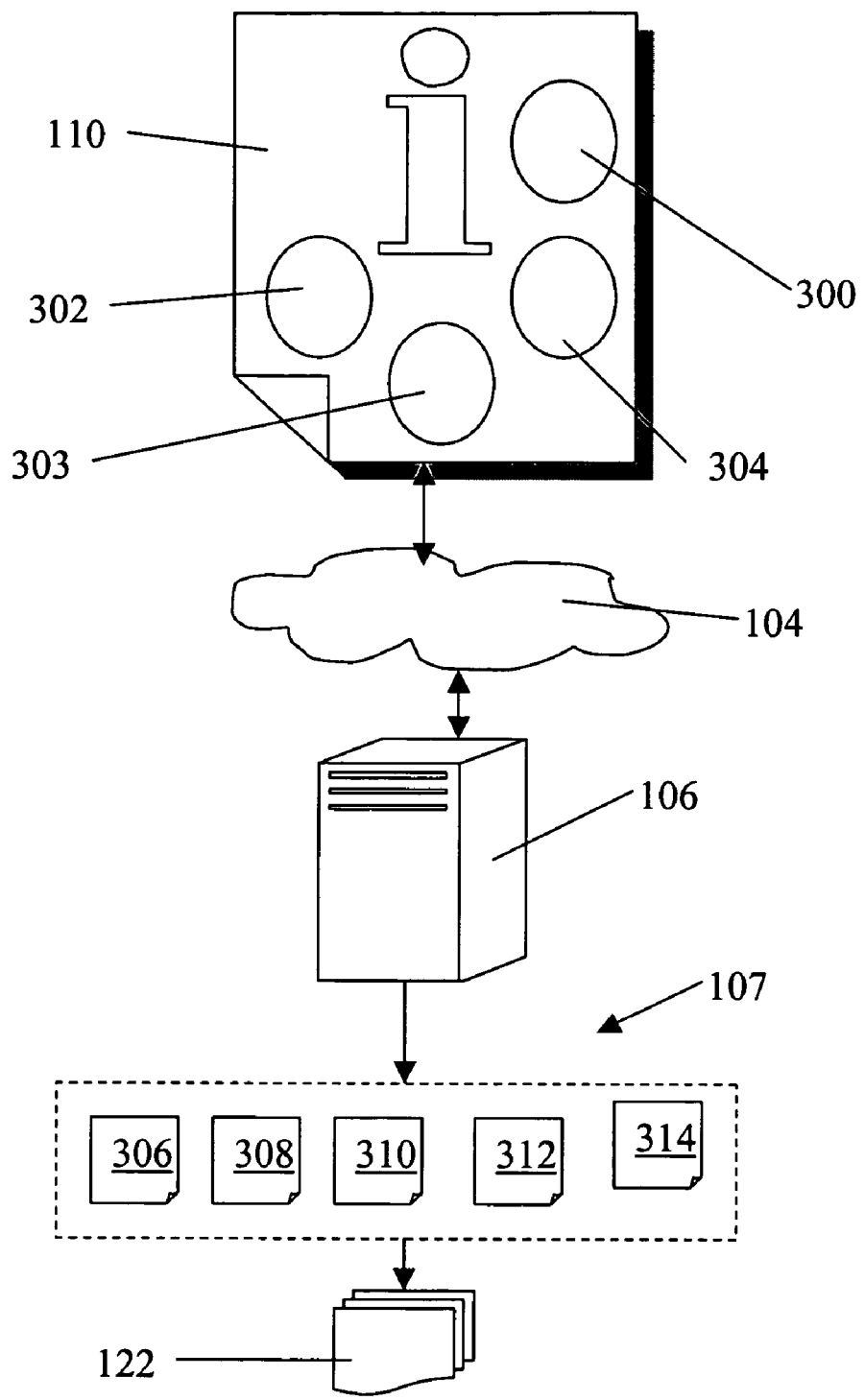
FIG. 3 is illustrates the relationship between templates and a service of FIG. 1.

Referring to FIG. 3, Application Templates 107 are intermediary entities of the application 122 generated by the Generation Server 106. Application Templates 107 can consist of interface elements such as : message definitions 300; data definitions 302; workflow components 303 and/or presentation definitions 304 obtained from the general schema of the web service 110.

The client application programs 122 can be defined as a set of platform-neutral component templates 107, namely for data 308 and message 306 components, and presentation components 310 using XML (or any other suitable structured definition language). The server 106 can generate component templates 107 based on meta-definitions 300, 302, 304 obtained from the web service 110, as further described below. With a large variety of terminal 100 runtime environments, cross-platform standards such as XML or ECMAScript can be used to define application metadata instead of pre-building the application programs 122. This delayed binding can allow generic application definitions of the application programs 122 to be run on a wide variety of terminal system environments, represented by various different devices 100.

In some implementations, expressing the data 308, message 306, and presentation 310 templates using XML or its derivatives, and the workflow elements 303, see below, using the ECMAScript and XML languages or their subsets, can allow an application developer to abstract the Web Service 100 client from any specific platform or environment and implement in principle "develop once run everywhere" applications. The following example shows how a Web Services 100 client application program 122 could be expressed using a structured definition language, such as but not limited to XML, and a platform neutral scripting/programming language, such as but not limited to ECMAScript, to generate the templates 306, 308, 310, and a workflow template 312, and a mixed template 314 as further described below.

Message Definitions 300

The message definition 300 contains message elements for defining a communication message 105 to be exchanged between the client application 122 and the Web Service 110 (see FIG. 1). The message 105 consists of field (element) definitions identifying for each the type of the field to be sent as part of a communication. The message definitions 300 can be written in a structured definition language such as but not limited to XML. The message definition 300 can contain fields of complex type. Such fields are defined by the data definition 302 and may contain multiple data fields. The message definition 300 can be mapped to the data definition 302 in which case each field of the data implies a corresponding field in the message. In this case the message can be completely constructed out of a particular instance of the data definition 302. If the message 105 is a response message then an instance of the mapped data definition 302 is dynamically created or updated upon receiving of the response. The definitions 300, 302, 304 can be used by the generation server 106 to create the message templates 306.

Example Message Template 306 in XML

```
<msg name="ordConfirmation" type="response"
action="mhConfirmation">
        <part name="orderId" type="String" />
        <part name="status" type="String" />
</msg>
```

Data Definitions 302

The data definition 302 defines a data structure used in and/or by the application 122. The data definition 302 consists of a set of field (element) definitions. Field definitions identify the data type of each field. Fields can be of complex type in which case its type is defined by another data definition 302. Multiple data instances of each data definition 302 may exist. Every instance is identified by a field recognized as primary key. The primary key field is indicated in the data definition 300 and must contain only unique values. The data definitions 300 can be written in the structured definition language such as but not limited to XML. The definitions 300, 302, 304 can be used by the generation server 106 to create the data templates 308.

Example Data Template 308 in XML

```
<data name="Order">
        <item name="orderId" type="Number" key="true"/>
        <item name="items" type="String" array="true"/>
        <item name="user" comp="true" compName="User"/>
        <item name="orderStatus" type="String"/>
    </data>
```

Presentation Definitions 304

The presentation definition 304 defines the appearance and functionality of such as one screen in the application 122, or other presentation element provided by a user interface of the terminal 100. The presentation definition 304 can consist of UI control (element) definitions and menu item (element) definitions. The presentation definition 304 may have as an input parameter the data definition 302. In this case during execution a data instance of the specified data definition 302 is supplied and used by the screen to populate its UI control with data. The presentation definitions 304 can be written in a structured definition language such as but not limited to XML. Some UI elements of the screen may initiate an outgoing communication by sending the message definition 300 to the Web Service 110. Further, the presentation definitions 304 can also include workflow components 303, such as but not limited to the definitions of navigation between screens.

Example Presentation Template 308 in XML with Workflow 303

```
<screen name="scrConfirmation" title="Order Confirmation"
param="Order">
        <layout type="vertical">
        <widget type="label" value="Order Confirmation Result:"/>
         < widget type="edit" value="@Order.orderStatus"/>
        </layout>
        <menu>
            <item label="Continue" navigate="@scrMain"/>
            ...
        </menu>
</screen>
```

Further, it is recognised that the mixed definition templates 314 (combination of the definitions 300, 302, 303, 304 ) and the workflow templates 312 written in such as but not limited to script may also be included in the templates 107. The workflow templates 312 could include navigation instructions between screens, as well as other workflow components 303 specifying the behavior of the message 300, data 302, and presentation definitions 304.

Generation Server

Figure 4:
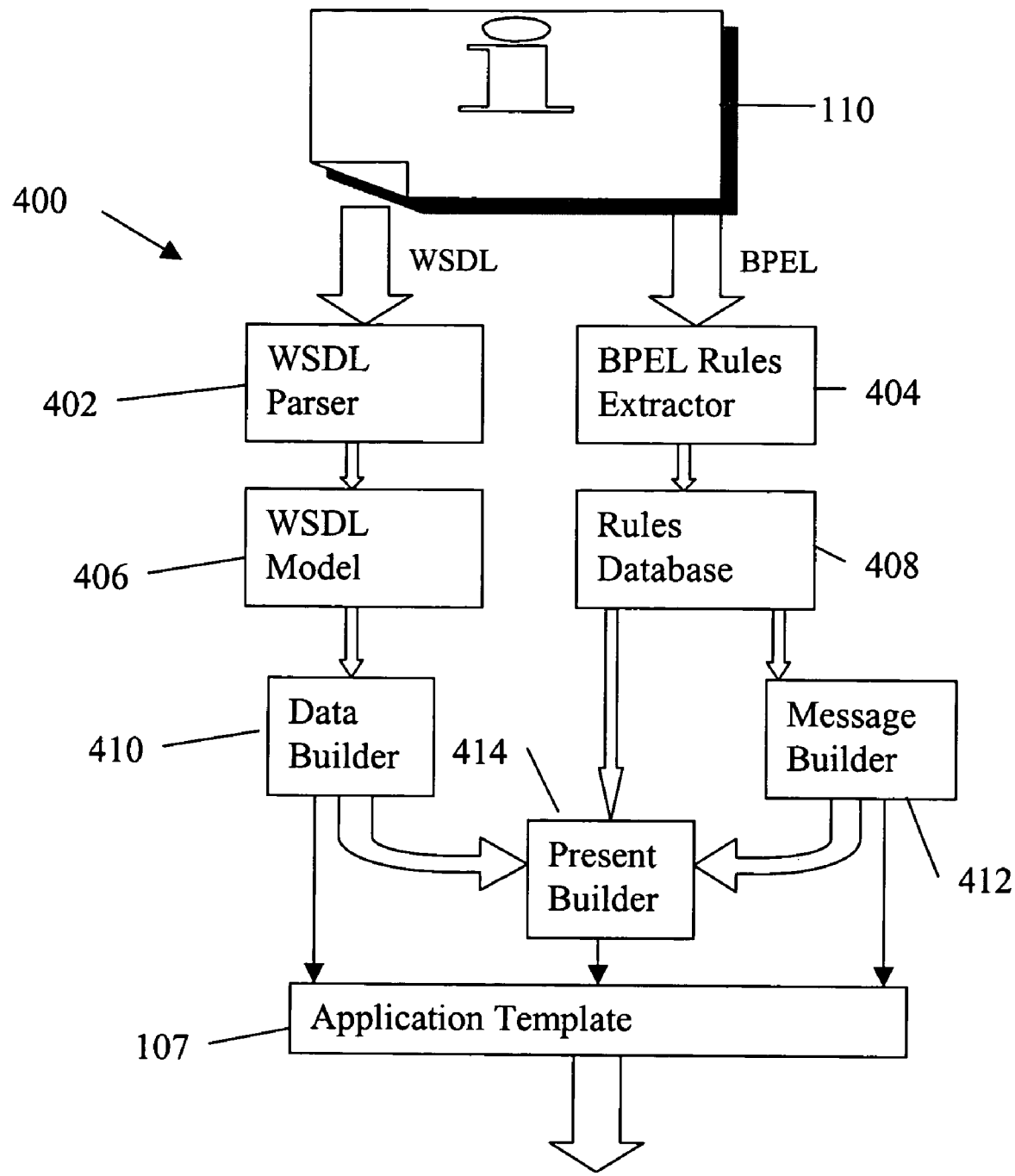
FIG. 4 is a block diagram of a generation server of FIG. 1.

The server 106 performs generation of the templates 107 from the definitions 300, 302, 303, 304 (see FIG. 3) of the web service 110. Referring to FIG. 4, the server components 400 use descriptions of the service 110, such as defined in WSDL and/or BPEL, for parsing, such that the application template 107 is generated. The definitions of the web service 110 as obtained by the generation server 106 can include the optional BPEL metadata, for building the component definitions of the application template 107.

Referring again to FIG. 4, the server components 400 can include, without limitation, a WSDL Parser 402 for parsing the WSDL definition of the Web Service 110 and building a WSDL model 406 containing the parsed elements of the definitions 300, 302, 303, 304 (see application template description above). The server components 400 can, in some instances, also include a BPEL Rule Extractor 404, which extracts rules and transaction information from the BPEL definition or from another source of Web Service metadata. The extracted rules can be placed in a rule database 408 or other suitable repository. The server components 400 can also include a Message Builder module 412, which uses the message definitions to build message templates of the templates 107. A Data Builder module 410 uses the data definitions to build data templates of the templates 107. A Presentation Builder module uses the presentation definitions, a well as message and data definitions, to build presentation templates of the templates 107. It is recognized that the builders 410, 412, 414 can use workflow definitions 303 (see FIG. 3) to build the templates 107, as well as interchanging the definitions to build the mixed definition templates 314, as desired.

Generation Stage

During the generation stage, the application template 107 is generated from the service schema of the Web Service 110. To improve the generation process additional input parameters may be supplied such as BPEL or another source of Web Service metadata.

Referring to FIGS. 4 and 5, the generation 500 of the application templates 107 can be as follows.

Step 502: Service Schema Analysis

This step can consist of two parts:

Parsing the input information including parse definition, for example, using the WSDL parser 402 for a definition in WSDL and build the model 406 of the Web Service 110 interface, and/or parse Web Service 110 metadata, for example, using the extractor 404 the BPEL or any additional Web Service 110 metadata; and Discovery of the interface elements of the definitions 300, 302, 303, 304 (see FIG. 3) such as but not limited to identify Web Service messages 105 and their parameters identify any complex types such as can be defined in the WSDL identify message 105 sequences or transaction boundaries out of addition Web Service metadata.

Step 504: Generate Message Definitions

During this step the message definition 300 (see FIG. 3) is generated by the message builder 412 for each message 105. The message 105 can be defined using a structured definition language such as WSDL. Each parameter of the Web Service 110 message produces a corresponding field in the message definition 300.

Step 506: Generate Data Definitions

During this step the data definitions 302 (see FIG. 3) for the application template 107 are generated. The data definition 302 can be generated by the data builder 410: for each message definition generated in Step 504; and for each complex type contained in another data definition 302. In addition data definitions 302 may be generated as a result of parsing any additional Web Service metadata such as BPEL definition.

Step 508: Generate Presentation Definitions

During this step the presentation definitions 304 (see FIG. 3) for the application template 107 are generated. Presentation builder 414 can generate a number of different types presentation definition 304. Various implementations can include one more of the following:

Main screen—the starting screen for the application 122. It presents the user with a choice of operations. Each operation corresponds to the message definitions 300 identified in Step 504. By selecting one of the operations on the main screen the user activates one of the message form screens;

Message form screens—the screens where the user can supply input data for each message 105 sent to the service 110. One message form screen is generated for each message definition 300. The message form screens contain UI elements for each field (element) in the message definition 300. In addition a Submit button is generated that will submit the message 105 when the user has completed entering data;

Result screens—the screens displaying the result of the message 105 sent to the service 110. One result screen is generated for each response message 105. The result screen contains UI components corresponding to the fields (elements) in the message 105. In addition a Continue button is generated that will return the control to the main screen;

Notification dialogs—the dialogs alerting user on notification events. These dialogs could be defined for Web Service 110 notifications (correlated and uncorrelated). Notification dialog could display the values in the notification message 105 and navigate user to the main screen (same as Result screens) or just alert user on notification event and redirect to associated Result screen; and Navigation instructions between screens and other workflow components 303 (see FIG. 3) for specifying the behavior of the message 300, data 302, and presentation 304 definitions.

Further, if additional metadata is available for the Web Service 110, then multiple screen definitions 304 can be chained together corresponding to a sequence or a transaction definition in the Web Service 110.

At step 510, the constructed definitions are assembled 510 into the application templates 107. It is recognized that interchanging definitions can be used by the process 500 to build the mixed definitions to result in mixed templates 107, as desired. At step 512, the templates 107 are made available such as to the user of the terminal 100 or the customization process 120 (see FIG. 1).

Customization Stage

The Customization Environment (customization provider) 120 (see FIG. 1) can include, without limitation, one or more of the following components (see FIG. 6): a Screen Designer 606 for providing presentation editing functionality of the template 107; a Data Designer 608 for providing data editing functionality of the template 107; and a Message Designer 610 for providing message editing functionality of the template 107.

Once the application templates 107 have been generated, a Customization stage 600 (see FIG. 6) can be provided in some implementations to give the application developer (or others) the opportunity to modify the application template 107 in a more desirable and user friendly way, depending on the context of each application 122 and potentially a runtime environment consideration of the terminal 100. The developer can add, remove and modify relations between data, message and screen definitions of the templates 107, such as but not limited to workflow component 303 definitions for modeling the behavior of the data 302, message 300 and screen 304 definitions. As a result of the customization stage 600, a final application 122 can be generated for execution on the terminal 100.

As is apparent, the generated application templates 107 can be used to generate application 122 without use of a customization stage 600. In such implementations, the applications templates 107 are used directly from the template generation process to create application 122.

Figure 6:
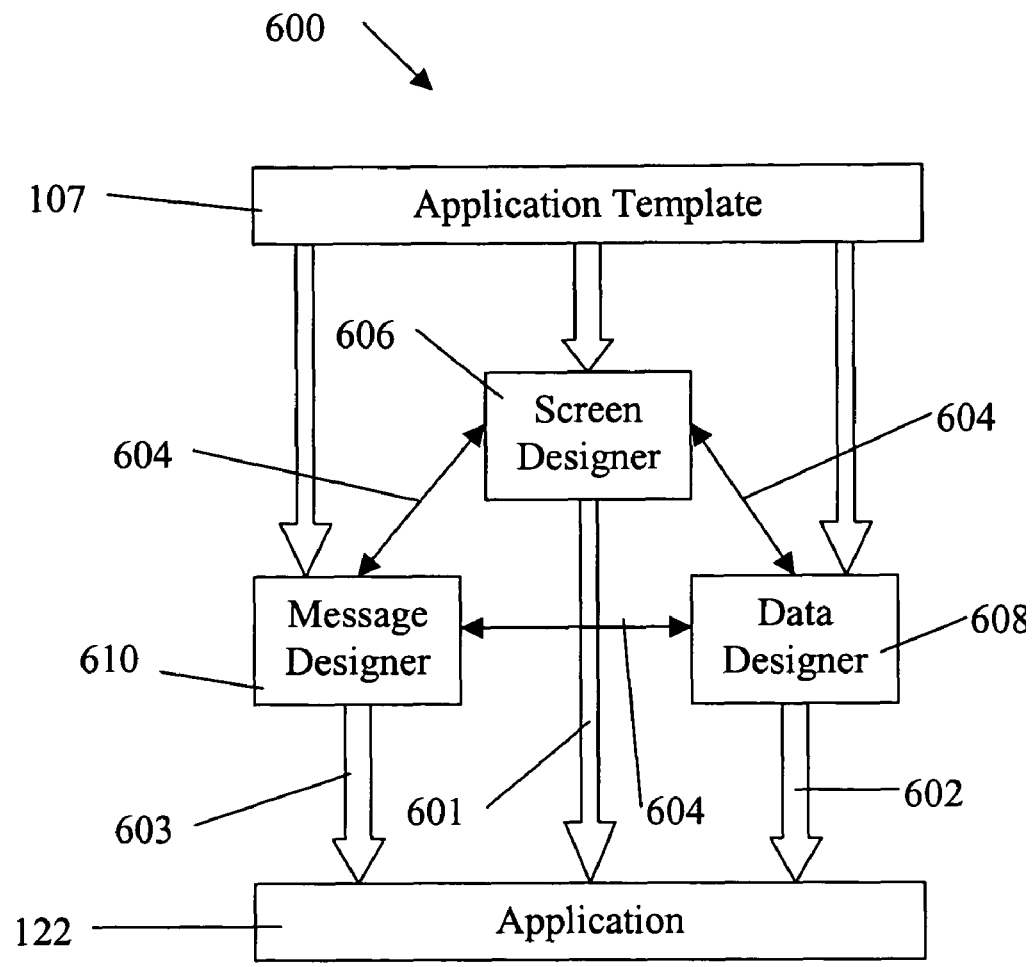
FIG. 6 is a diagram of a system for customizing the templates of FIG. 1.

Referring to FIG. 6, the following Customization procedure 600 can be used.

Step 601: Edit Screen Definitions 304

In this step the user can perform the following operations: modify screen transitions in a way that is meaningful and practical for the given application 122 context; define relations between screens 304 and data 302 definitions; define relations between screens UI components and data fields; improve usability and appearance by adding, removing or modifying UI functionality; and binding messages submitting to UI actions such as menu items and buttons.

Step 602: Edit Data Definitions 302

In this step the user can perform the following operations: add, remove or modify data 302 definitions in order to improve the data model of the application 122; and redefine relations with message 300 and screen 304 definitions due to changes of an existing data definition.

Step 603: Edit Message Definitions 300

In this step the user can perform the following operations: remove messages that are not used by the application 122; and adjust mapping relations between message 300 and data 302 definitions.

Step 604: Add Workflow Component Definitions Other than Defined in Step 601

The workflow components 406 can be defined using ECMAScript (or any other suitable platform-neutral scripting language).

Based on the above system 10, it is recognised that application generation and customization can be initiated by the user of the terminal 100 discovering the web service 110 using such as but not limited to: a device browser; an email attachment; or a dedicated web service discovery application. The user then makes the request for generation of the application template 107 for subsequent communication with discovered web service 110. The user can make the request using one of two options, namely: Option 1 the user makes the request to the dedicated generation server 106; and Option 2 the user makes the request directly to the UDDI registry 124 specifying the client type (e.g. wireless client). The registry 124 can have enabled special components to generate (or retrieve a stored one) the client template 107. The request for customization can be sent to a dedicated design body or to the originating user if she/he is authorized for application 122 customizations, or to such as but not limited to an administrator or an entity for certifying or otherwise authorizing new web services 110. The finalized application 122 can be stored on the client device 100 and optionally provisioned back to application repository 128 for access by other users. The user can start the application 122 and access the web service 110.

The above description relates to one or more exemplary systems and methods. Many variations will be apparent to those knowledgeable in the field, and such variations are within the scope of the application. For example, although XML and a subset of ECMAScript are used in the examples provided, other languages and language variants, such as but not limited to HTML and XSML, may be used to define the template 107. Further, it is recognized that the server can comprise hardware and/or software components for implementing the system 10, such as: a network interface module for obtaining schema definitions of the service from a source; a parser module for parsing the schema definitions; and a model module for representing a model of a service interface for representing the service; a builder module the application template according to the model.

The embodiments of the invention in which an exclusive property or priviledge is claimed are defined as the follows:

1. A computer-implemented method for dynamically generating an executable application for accessing a web service, the computer-implemented method comprising:
    obtaining a schema definition of the web service, the web service responding to the executable application executed on a wireless device via a wireless network;
    parsing the schema definition of the web service;
    generating a plurality of interface element definitions for an application template from the parsed schema definition of the web service, the plurality of interface element definitions including a message definition, a data definition, and a presentation definition; and a workflow element, wherein the workflow element specifies a behavior of the message definition, the data definition, and the presentation definition;
    assembling the application template based on the plurality of interface element definitions, the application template comprising at least one of a message template, a data template, a presentation template, and a workflow template, wherein the message template, the data template, the presentation template, and the workflow template are generated using the plurality of interface element definitions;
    customizing in a customization environment the application template by adding, removing, or modifying relationships between the message definition, the data definition, and the presentation definition of the application template, the customization environment including at least one member selected from the group consisting of: a message designer, a data designer, and a screen designer; and
    generating the executable application using the customized application template, the customized application template allowing the executable application executed on the wireless device to access the web service.

2. The computer-implemented method according to claim 1, wherein the workflow element is expressed in a script.

3. The computer-implemented method according to claim 1, wherein the message template, the data template, the presentation template, and the workflow template are expressed in a structured definition language.

4. The computer-implemented method according to claim 3, wherein the structured definition language is based on Extensible Markup Language (XML).

5. The computer-implemented method according to claim 1, further comprising including in the message template, a communication message definition of a communication message to be exchanged between the web service and the executable application.

6. The computer-implemented method according to claim 5, further comprising including the communication message definition mapped to one of data templates in the message template.

7. The computer-implemented method according to claim 1, further comprising including in the data template, a definition of a data structure to be used by the executable application.

8. The computer-implemented method according to claim 1, further comprising including in the presentation template, a presentation and functionality presentation definition of a presentation and functionality of a presentation element for presentation on the wireless device.

9. The computer-implemented method according to claim 8, further comprising including the presentation and functionality presentation definition mapped to one of message definitions in the presentation template.

10. The computer-implemented method according to claim 8, further comprising linking a plurality of presentation templates to represent a workflow sequence of the web service.

11. The computer-implemented method according to claim 1, wherein the schema definition of the web service is obtained from a service registry.

12. The computer-implemented method according to claim 11, wherein the service registry has a link to a generation server producing the application template.

13. The computer-implemented method according to claim 1, wherein the web service is based on a Web Service Definition Language (WSDL).

14. The computer-implemented method according to claim 13, further comprising obtaining additional metadata expressed in a Business Process Execution Language (BPEL).

15. A server for dynamically generating an executable application accessing a web service, the server comprising:
   a computer processor;
   a network interface obtaining a schema definition of the web service, the web service responding to the executable application executed on a wireless device via a wireless network;
   a parser module parsing the schema definition of the web service;
   a first generator generating a plurality of interface element definitions for an application template from the parsed schema definition of the web service, the plurality of interface element definitions including a message definition, a data definition, and a presentation definition; and a workflow element, wherein the workflow element specifies a behavior of the message definition, the data definition, and the presentation definition;
   an assembler assembling the application template based on the plurality of interface element definitions, the application template comprising at least one of a message template, a data template, a presentation template and a workflow template, wherein the message template, the data template, the presentation template, and the workflow template are generated using the plurality of interface element definitions;
   a customizer customizing in a customization environment the application template by adding, removing, or modifying relationships between the message definition, the data definition, and the presentation definition of the application template, the customization environment including at least one member selected from the group consisting of: a message designer, a data designer, and a screen designer; and
   a second generator generating the executable application using the customized application template, the customized application template allowing the executable application executed on the wireless device to access the web service.

16. The server according to claim 15, wherein the workflow element is expressed in a script.

17. The server according to claim 15, wherein the message template, the data template, the presentation template, and the workflow template are expressed in a structured definition language.

18. The server according to claim 17, wherein the structured definition language is based on Extensible Markup Language (XML).

19. The server according to claim 15, further comprising a message builder including in the message template, a communication message definition of a communication message to be exchanged between the web service and the executable application.

20. The server according to claim 19, wherein the message builder includes the communication message definition mapped to one of data templates in the message template.

21. The server according to claim 15, further comprising a data builder including in the data template, a definition of a data structure to be used by the executable application.

22. The server according to claim 15, further comprising a presentation builder including in the presentation template, a presentation and functionality presentation definition of a presentation and functionality of a presentation element for presentation on the wireless device.

23. The server according to claim 22, wherein the presentation builder includes the presentation and functionality presentation definition mapped to one of message definitions in the presentation template.

24. The server according to claim 22, wherein the presentation builder links a plurality of presentation templates to represent a workflow sequence of the web service.

25. The server according to claim 15, wherein the schema definition of the web service is obtained from a service registry.

26. The server according to claim 25, further comprising a link to the service registry.

27. The server according to claim 15, wherein the web service is based on a Web Service Definition Language (WSDL).

28. The server according to claim 27, wherein the application template is configured for including additional metadata expressed in a Business Process Execution Language (BPEL).

29. A non-transitory computer readable storage medium readable by a computer encoding a computer program for execution by the computer to carry out a method for dynamically generating an executable application for accessing a web service, the computer program comprising:
   code means for obtaining a schema definition of the web service, the web service responding to the executable application executed on a wireless device via a wireless network;
   code means for parsing the schema definition of the web service;
   code means for generating a plurality of interface element definitions for an application template from the parsed schema definition of the web service, the plurality of interface element definitions including a message definition, a data definition, and a presentation definition; and a workflow element, wherein the workflow element specifies a behavior of the message definition, the data definition, and the presentation definition;
   code means for assembling the application template based on the plurality of interface element definitions, the application template comprising at least one of a message template, a data template, a presentation template, and a workflow template, wherein the message template, the data template, the presentation template, and the workflow template are generated using the plurality of interface element definitions;
   code means for customizing in a customization environment the application template by adding, removing, or modifying relationships between the message definition, the data definition, and the presentation definition of the application template, the customization environment including at least one member selected from the group consisting of: a message designer, a data designer, and a screen designer; and code means for generating the executable application using the customized application template, the customized application template allowing the executable application executed on the wireless device to access the web service.

* * * * *